US012175916B2

(12) United States Patent
Sasaki

(10) Patent No.: US 12,175,916 B2
(45) Date of Patent: Dec. 24, 2024

(54) DISPLAY DEVICE

(71) Applicant: Sharp Display Technology Corporation, Kameyama (JP)

(72) Inventor: Osamu Sasaki, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/381,965

(22) Filed: Oct. 19, 2023

(65) Prior Publication Data

US 2024/0169882 A1 May 23, 2024

(30) Foreign Application Priority Data

Nov. 22, 2022 (JP) ................................ 2022-186900

(51) Int. Cl.
*G09G 3/20* (2006.01)

(52) U.S. Cl.
CPC ... *G09G 3/2092* (2013.01); *G09G 2310/0254* (2013.01); *G09G 2310/0267* (2013.01); *G09G 2310/0283* (2013.01); *G09G 2310/0286* (2013.01)

(58) Field of Classification Search
None
See application file for complete search history.

(56) References Cited

U.S. PATENT DOCUMENTS

2005/0179677 A1* 8/2005 Nojiri .................. G09G 3/3614 345/204
2009/0179879 A1* 7/2009 Nozawa ................. G09G 3/003 345/204
2010/0207919 A1* 8/2010 Sawahata ............ G09G 3/3648 345/96
2015/0318849 A1* 11/2015 Wu ...................... H03K 17/002 327/393
2019/0073957 A1* 3/2019 Yang .................... G09G 3/3258
2021/0065610 A1* 3/2021 Xu ......................... G11C 19/28

FOREIGN PATENT DOCUMENTS

JP 2014-041247 A 3/2014

* cited by examiner

*Primary Examiner* — Amare Mengistu
*Assistant Examiner* — Sarvesh J Nadkarni
(74) *Attorney, Agent, or Firm* — ScienBiziP, P.C.

(57) ABSTRACT

A display device has a gate drive circuit that performs scanning to sequentially supply a gate signal, and a source drive circuit that inverts the polarity of the voltage applied to the source line in each vertical scanning period. The gate drive circuit starts scanning from a first gate line among the plurality of gate lines when scanning the gate lines in a preceding period of two consecutive vertical scanning periods, and starts scanning from a second gate line different from the first gate line when scanning the gate lines in a period following the preceding period of two vertical scanning periods.

6 Claims, 11 Drawing Sheets

SECOND STATE

COMPARATIVE EXAMPLE

DISPLAY DEVICE

BACKGROUND

1. Field

The present disclosure relates to a display device. This application claims the benefit of priority to Japanese Patent Application Number 2022-186900 filed on Nov. 22, 2022. The entire contents of the above-identified application are hereby incorporated by reference.

2. Description of the Related Art

In the related art, a display device provided with a gate drive circuit that sequentially supplies gate signals to a plurality of gate lines is known. Such a display device is disclosed in, for example, Japanese Unexamined Patent Application Publication No. 2014-41247.

The display device described in Japanese Unexamined Patent Application Publication No. 2014-41247 is an active matrix drive system display device. The display device has a thin-film transistor substrate on which pixel electrodes and thin-film transistors are arranged in a matrix. A plurality of gate lines and a plurality of source lines are formed on the thin-film transistor substrate. The display device includes a scanning line drive circuit that sequentially applies scanning pulses (gate signals) to the gate lines and a video line drive circuit that applies signal voltages (source signals) to the respective source lines. The display device has a plurality of display areas, and scanning pulses are applied sequentially to each display area. When a scanning pulse is applied via the gate line, the thin-film transistor becomes conductive. The pixel electrode becomes connected to the source line via the thin-film transistor, that has become conductive, and a signal voltage (source signal) from the source line is applied. The video line drive circuit performs frame inversion drive, in which the polarity of the source signal applied to the pixel electrode is inverted for each frame (vertical scanning period).

In a display device in which a thin-film transistor is provided, a parasitic capacitance is generated between the source electrode (and source line) and the drain electrode of the thin-film transistor. In the display device described in Japanese Unexamined Patent Application Publication No. 2014-41247 above, the polarity of the source signal applied to the pixel electrode is inverted in each vertical scanning period. As a result, the potential of the pixel electrode once charged by the source signal changes (the absolute value becomes small). Even when the thin-film transistor is OFF, a small current flows between the source and drain electrodes via the resistance (hereinafter referred to as "off-resistance"). This causes the once charged pixel electrode to be discharged gradually.

Among the thin-film transistors, the later the thin-film transistor is turned to the ON state in the vertical scanning period, the longer the period during which the polarity of the voltage of the source electrode and the polarity of the voltage of the drain electrode are different becomes. As a result, the change in the potential of the pixel electrode connected to the thin-film transistor that is turned to the ON state later in the vertical scanning period is larger than the change in the potential of the pixel electrode connected to the thin-film transistor that is turned to the ON state earlier in the vertical scanning period. Therefore, in the display device described in Japanese Unexamined Patent Application Publication No. 2014-41247, there is a problem in that variations in luminance caused by a difference in the magnitude of change in the potential of the pixel electrodes are visible.

It is desirable to provide a display device in which variations in luminance caused by a difference in the magnitude of change in the potential of the pixel electrodes are hardly visible, even when the polarity of the voltage applied to the source line is inverted in each vertical scanning period.

SUMMARY

According to an aspect of the present disclosure, there is provided a display device according to an aspect of the present disclosure includes a thin-film transistor, a source line connected to the thin-film transistor, a plurality of gate lines arranged while intersecting the source line, a gate drive circuit that performs scanning to sequentially supply a gate signal to the plurality of gate lines, and a source drive circuit that applies a voltage to the source line and that inverts the polarity of the voltage applied to the source line in each vertical scanning period. The gate drive circuit starts scanning from a first gate line among the plurality of gate lines when scanning the gate lines in a first vertical scanning period that is the preceding scanning period of two consecutive vertical scanning periods, and starts scanning from a second gate line different from the first gate line when scanning the gate lines in a second vertical scanning period following the first vertical scanning period of the two vertical scanning periods.

DESCRIPTION OF THE EMBODIMENTS

Figure 1:
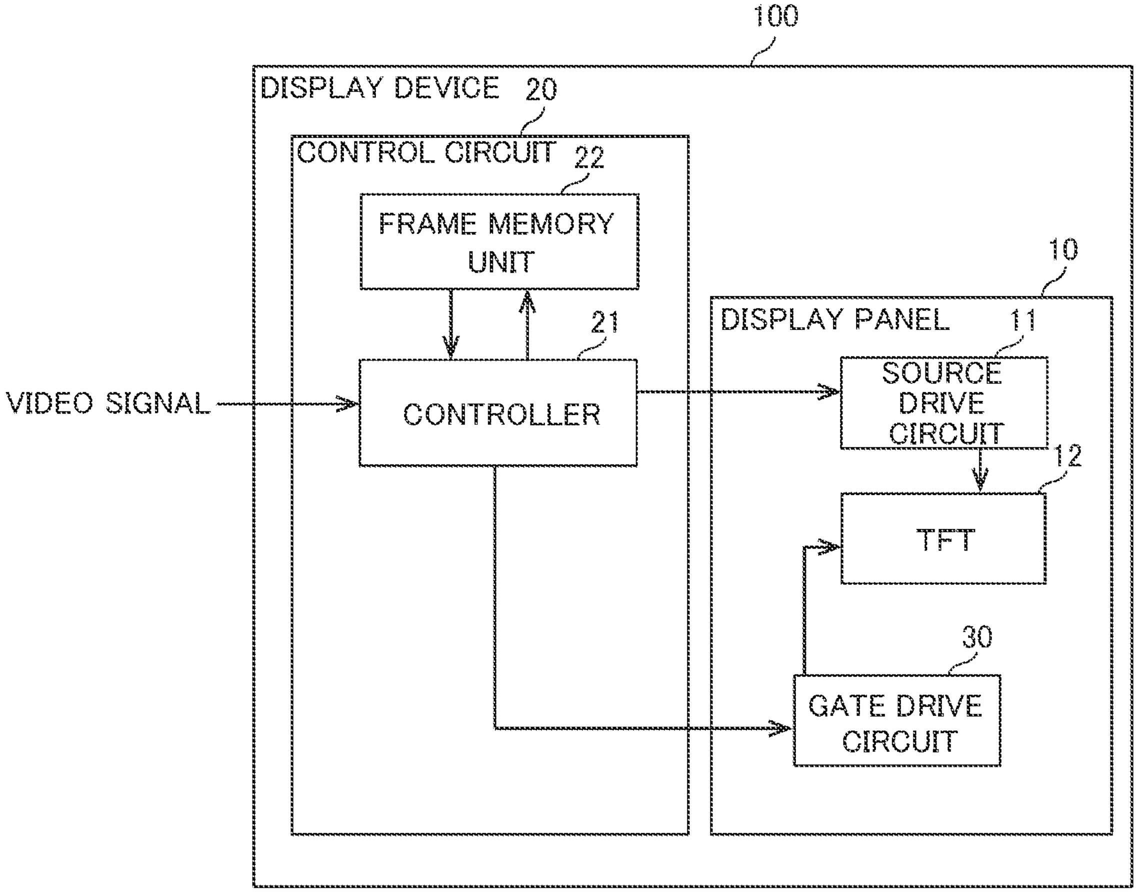
FIG. 1 is a block diagram illustrating a schematic configuration of a display device 100 according to a first embodiment.

Hereinafter, an embodiment of the present disclosure will be described with reference to drawings. Note that the present disclosure is not limited to the following embodiment, and design thereof can be modified as appropriate within the scope that satisfies a configuration of the present disclosure. In the following descriptions, the same portions or portions having a similar function are denoted by the same reference numerals in different drawings in common, and descriptions thereof are omitted. In addition, configurations described in the embodiment and the modification examples may be appropriately combined or modified without departing from the spirit of the present disclosure. Further, in order to make the descriptions easy to understand, in the drawings referred to below, the configuration is illustrated in a simplified or schematic manner, or some constituent members are omitted.

First Embodiment

Overall Configuration of Display Device

Figure 2:
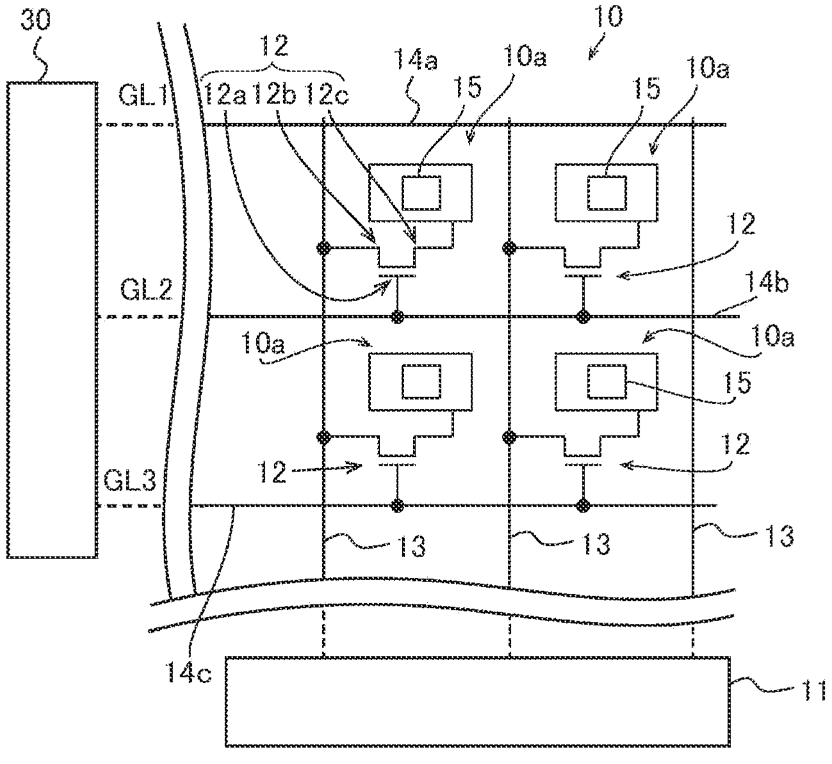
FIG. 2 is a diagram schematically illustrating part of a configuration of a display panel.

FIG. 1 is a block diagram illustrating a schematic configuration of a display device 100 according to a first embodiment. FIG. 2 is a diagram schematically illustrating part of a configuration of a display panel 10. The display device 100 is a device that displays images (video) based on video signals (R, G, B) supplied from an external device that is not illustrated. The display device 100 is, for example, a personal computer, a tablet terminal, a smartphone, a smartwatch, or a television device. The display device 100 is provided with the display panel 10 and a control circuit 20.

Figure 4:
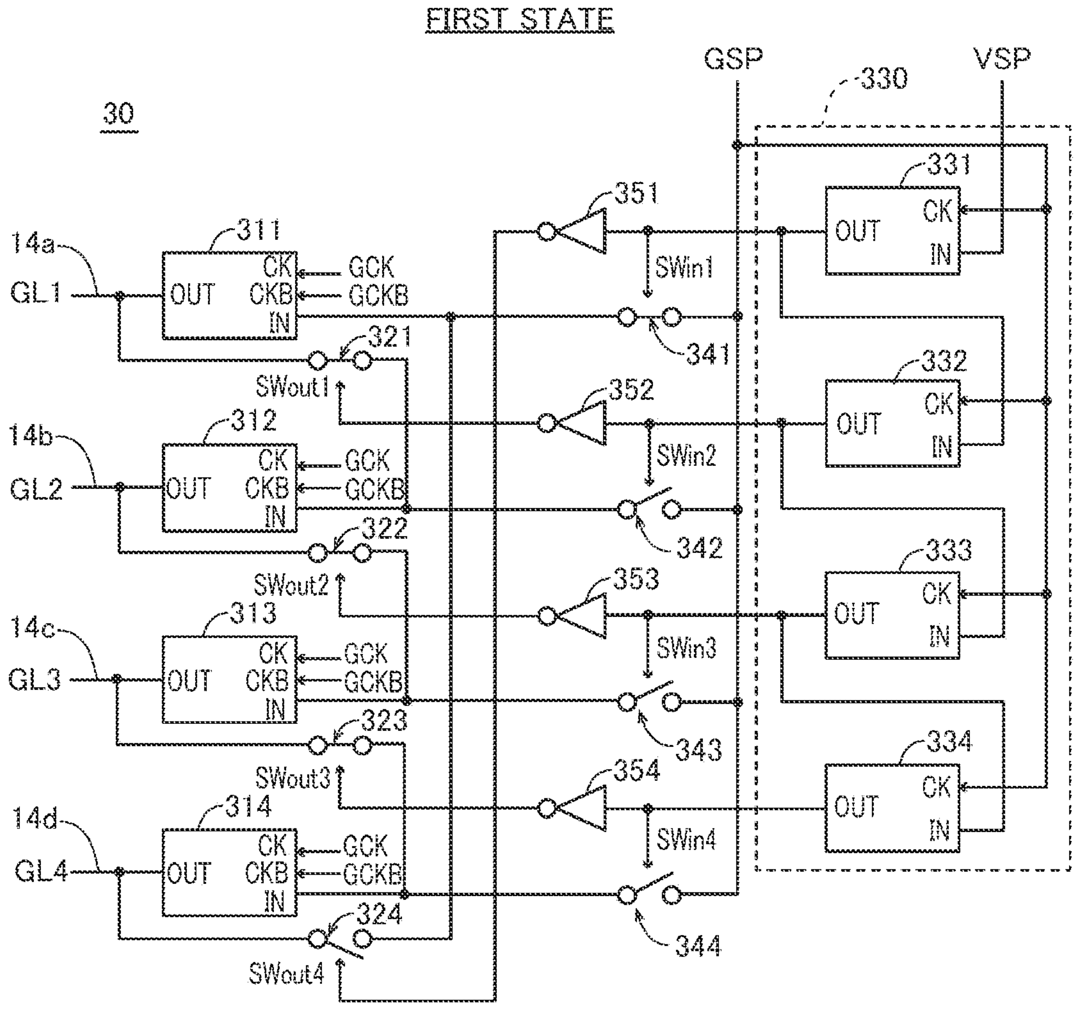
FIG. 4 is a circuit diagram schematically illustrating a configuration of the gate drive circuit.

As illustrated in FIG. 1, the display panel 10 includes a source drive circuit 11, a thin-film transistor 12 (hereinafter "TFT12"), and a gate drive circuit 30. As illustrated in FIG. 2, the display panel 10 further includes a plurality of source lines 13 extending from the source drive circuit 11, and gate lines 14*a* to 14*d* (see FIG. 4) extending from the gate drive circuit 30. The gate lines 14*a* to 14*d* intersect the source lines 13. In the display panel 10, a plurality of pixels 10*a* are formed in each region demarcated by the gate lines 14*a* to 14*d* and the source lines 13. Each of the pixels 10*a* is provided with a TFT 12 and a pixel electrode 15. The gate drive circuit 30 sequentially supplies gate signals to the TFTs 12 in each row according to the control signals supplied from the control circuit 20. The source drive circuit 11 supplies source signals to the pixel electrodes 15 via the TFT 12 according to the video signals and control signals supplied from the control circuit 20. As a result, the gate drive circuit 30 and the source drive circuit 11 rewrite the image displayed on the display panel 10 in each vertical scanning period (frame period) according to the input video signals. The gate line (e.g., gate line 14*b*) is connected to a gate electrode 12*a* of the TFT 12, the source line 13 is connected to a source electrode 12*b* of the TFT 12, and the pixel electrode 15 is connected to a drain electrode 12*c* of the TFT 12. In FIG. 4, to simplify the description, the number of gate lines that is illustrated is four, but the number of gate lines can be five or more.

As illustrated in FIG. 1, the control circuit 20 includes a controller 21 and a frame memory unit 22. The controller 21 includes a processor that executes the control processing of the display device 100. The frame memory unit 22 includes a RAM. The controller 21 supplies control signals based on video signals to the source drive circuit 11 and the gate drive circuit 30.

Figure 3:
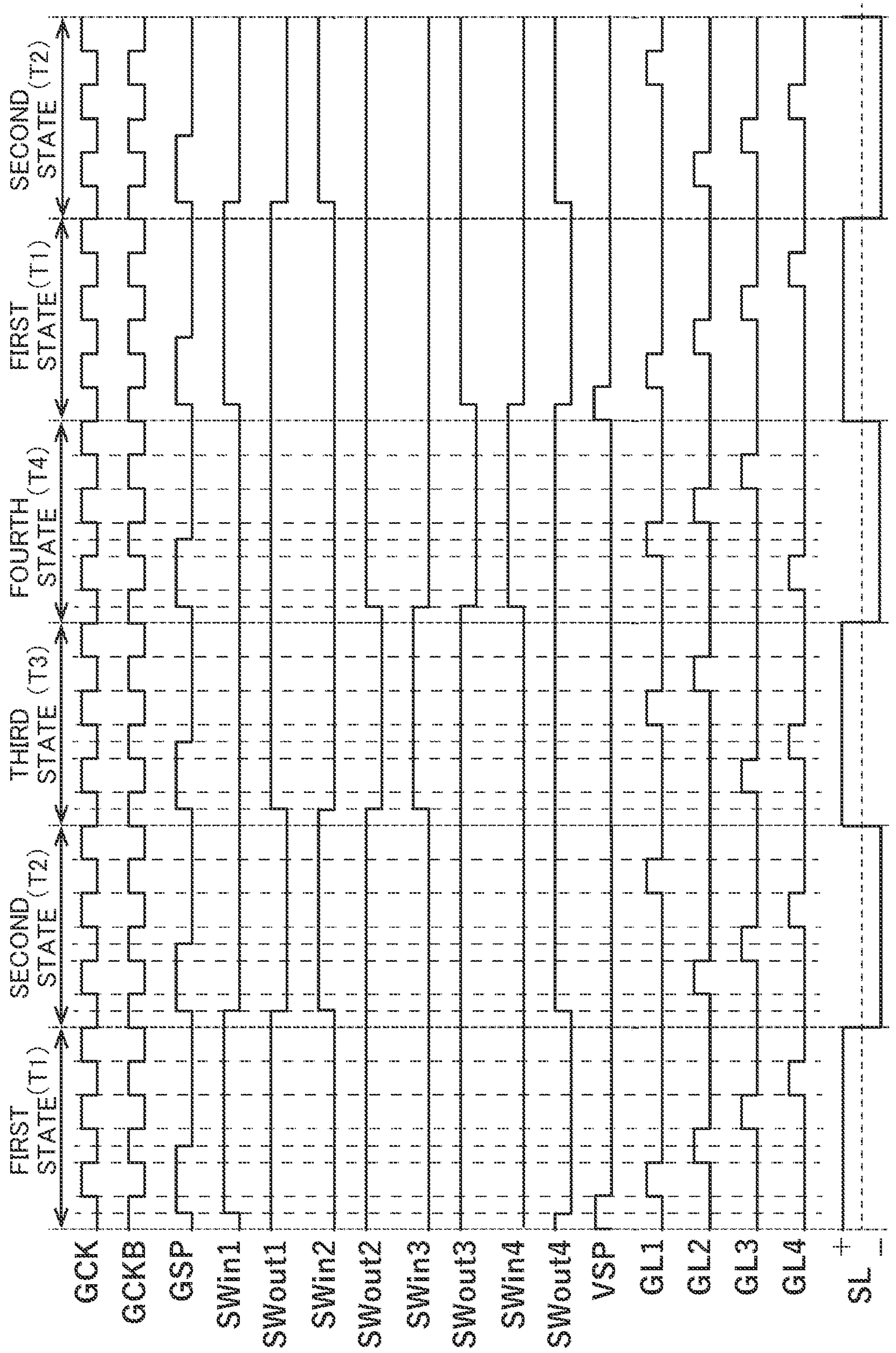
FIG. 3 is a timing chart illustrating signals input to and output from a gate drive circuit, signals for controlling switches in the gate drive circuit, and signals output from a source drive circuit.

FIG. 3 is a timing chart illustrating signals input to and output from the gate drive circuit 30, signals for controlling switches in the gate drive circuit 30, and signals output from the source drive circuit 11. As illustrated in FIG. 3, the source drive circuit 11 inverts the polarity of the voltage applied to the source line 13 in each vertical scanning period according to the control signal (e.g., vertical synchronous signal) received from the controller 21. For example, in the first vertical scanning period ("period T1"), the source drive circuit 11 applies a voltage (source signal) having positive polarity to the source line 13. Then, in the second vertical scanning period ("period T2") following period T1, the source drive circuit 11 applies a voltage having negative polarity to the source line 13. Then, in the third vertical scanning period ("period T3") following period T2, the source drive circuit 11 applies a voltage having positive polarity to the source line 13. Then, in the fourth vertical scanning period ("period T4") following period T3, the source drive circuit 11 applies a voltage having negative polarity to the source line 13. Note that, in FIG. 3, the source signal voltage in the vertical scanning period is illustrated as having a fixed value, but the source signal voltage has a voltage value corresponding to the pixel value of the video signal. The source signal voltage may be supplied such that all source lines 13 have the same polarity, or the source signal voltage may be supplied such that the two adjacent source lines 13 have different polarities from each other.

As illustrated in FIG. 3, the controller 21 supplies, for example, a gate start pulse signal GSP, a clock signal GCK, a clock signal GCKB, and a signal VSP to the gate drive circuit 30 based on the input video signal. The gate start pulse signal GSP is a pulse signal supplied once to the gate drive circuit 30 in each vertical scanning period. The clock signal GCK is a pulse signal supplied to the gate drive circuit 30 for a number of times equal to the number of gate lines minus one (three times in FIG. 3) per vertical scanning period. The clock signal GCKB is a pulse signal with a voltage that inverts the polarity of the clock signal GCK. That is, the level of the clock signal GCKB is Low when the level of the clock signal GCK is High and the level of the clock signal GCKB is High when the level of clock signal GCK is Low. The signal VSP is a pulse signal that is output once each time the vertical scanning period is repeated for the same number of times (four times in the case of the example in FIG. 3) as the number of gate lines (four in the case of the example in FIG. 3). In the case of the example in FIG. 3, the signal VSP is output once in each period T1, and the signal VSP is not output in periods T2 to T4.

Here, as illustrated in FIG. 3, the gate drive circuit 30 of the present embodiment starts scanning in period T2 from the gate line 14*b*, which is different from the gate line 14*a* that is first supplied with a gate signal GL1 in period T1 (a gate signal GL2 is supplied to the gate line 14*b*), and at the end of scanning in period T2, the gate drive circuit 30 supplies the gate signal GL1 to the gate line 14*a*. The number of gate lines to be scanned in each of periods T1 to T4 is the same. In other words, in periods T1 to T4, scanning is performed for all gate lines. Referring to FIGS. 4 to 7, the configuration of the gate drive circuit 30 for implementing this operation will be described.

FIGS. 4 to 7 are circuit diagrams schematically illustrating the configuration of the gate drive circuit 30. The gate drive circuit 30 includes a first drive circuit 311 connected to the gate line 14*a*, a second drive circuit 312 connected to the gate line 14*b*, a third drive circuit 313 connected to the gate line 14*c*, and a fourth drive circuit 314 connected to the gate line 14*d*. The first drive circuit 311, the second drive circuit 312, the third drive circuit 313, and the fourth drive circuit 314 constitute a shift register circuit and sequentially output gate signals. The first drive circuit 311 supplies the gate signal GL1 to the gate line 14*a*, the second drive circuit 312 supplies the gate signal GL2 to the gate line 14*b*, the third drive circuit 313 supplies a gate signal GL3 to the gate line 14*c*, and the fourth drive circuit 314 supplies a gate signal GL4 to the gate line 14*d*.

As illustrated in FIG. 4, the gate start pulse signal GSP or a gate signal from the previous stage drive circuit, the clock signal GCK, and the clock signal GCKB are input to each of the first drive circuit 311, the second drive circuit 312, the third drive circuit 313, and the fourth drive circuit 314. The "gate signal from the previous stage drive circuit" means that, for the second drive circuit 312, the gate signal GL1 is output from the first drive circuit 311; for the third drive circuit 313, the gate signal GL2 is output from the second drive circuit 312; for the fourth drive circuit 314, the gate signal GL3 is output from the third drive circuit 313; and for the first drive circuit 311, the gate signal GL4 is output from the fourth drive circuit 314.

The gate drive circuit 30 of the present embodiment includes switches 321 to 324, a shift register circuit 330, switches 341 to 344, and NOT circuits 351 to 354. The switch 321 is connected to the output of the first drive circuit 311, the input of the second drive circuit 312, and the switch 342. The switch 322 is connected to the output of the second drive circuit 312, the input of the third drive circuit 313, and the switch 343. The switch 323 is connected to the output of the third drive circuit 313, the input of the fourth drive circuit 314, and the switch 344. The switch 324 is connected to the output of the fourth drive circuit 314, the input of the first drive circuit 311, and the switch 341.

The shift register circuit 330 includes flip-flop circuits 331 to 334 that are connected in series. The gate start pulse signal GSP is input to the clock signal terminal of each of the flip-flop circuits 331 to 334. The signal VSP is input to the input terminal of the flip-flop circuit 331. A signal SWin1 output from the flip-flop circuit 331 is input to the flip-flop circuit 332, the switch 341 and the NOT circuit 351. When the level of the signal SWin1 is High, the switch 341 is in the ON state (allowed to conduct), and when the level of the signal SWin1 is Low, the switch 341 is in the OFF state (blocked). The NOT circuit 351 inputs to the switch 324 a signal SWout4, that inverts the level of the signal SWin1. In other words, the switch 324 turns into the OFF state when the switch 341 is in the ON state and turns into the ON state when the switch 341 is in the OFF state.

The signal SWin1 is input to the input terminal of the flip-flop circuit 332. A signal SWin2 output from the flip-flop circuit 332 is input to the flip-flop circuit 333, the switch 342, and the NOT circuit 352. The NOT circuit 352 inputs to the switch 321 a signal SWout1, that inverts the level of the signal SWin2. In other words, the switch 321 turns into the OFF state when the switch 342 is in the ON state and turns into the ON state when the switch 342 is in the OFF state.

The signal SWin2 is input to the input terminal of the flip-flop circuit 333. A signal SWin3 output from the flip-flop circuit 333 is input to the flip-flop circuit 334, the switch 343, and the NOT circuit 353. The NOT circuit 353 inputs to the switch 322 a signal SWout2, that inverts the level of the signal SWin3. In other words, the switch 322 turns into the OFF state when the switch 343 is in the ON state and turns into the ON state when the switch 343 is in the OFF state.

The signal SWin3 is input to the input terminal of the flip-flop circuit 334. A signal SWin4 output from the flip-flop circuit 334 is input to the switch 344 and the NOT circuit 354. The NOT circuit 354 inputs to the switch 323 a signal SWout3, that inverts the level of the signal SWin4. In other words, the switch 323 turns into the OFF state when the switch 344 is in the ON state and turns into the ON state when the switch 344 is in the OFF state.

Figure 5:
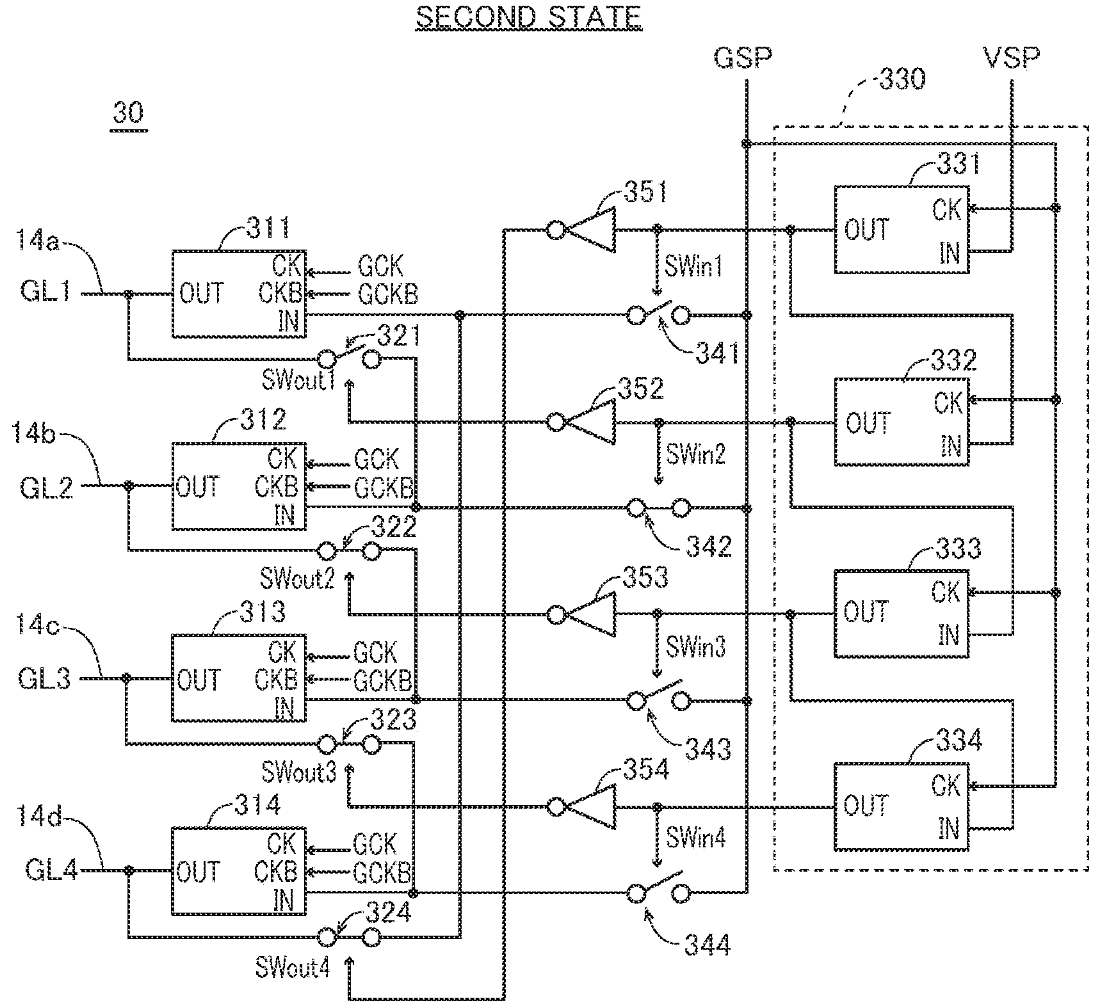
FIG. 5 is a circuit diagram schematically illustrating the configuration of the gate drive circuit.
Figure 6:
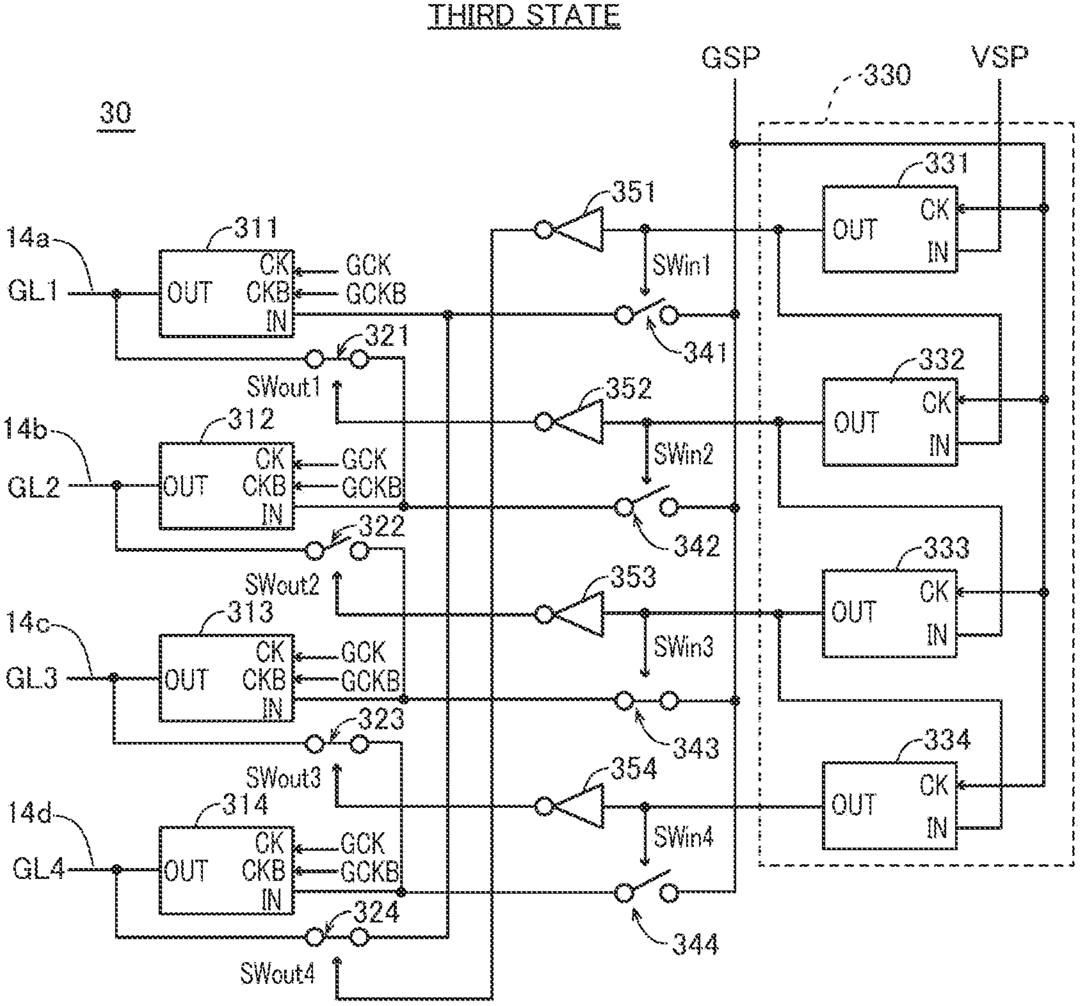
FIG. 6 is a circuit diagram schematically illustrating the configuration of the gate drive circuit.
Figure 7:
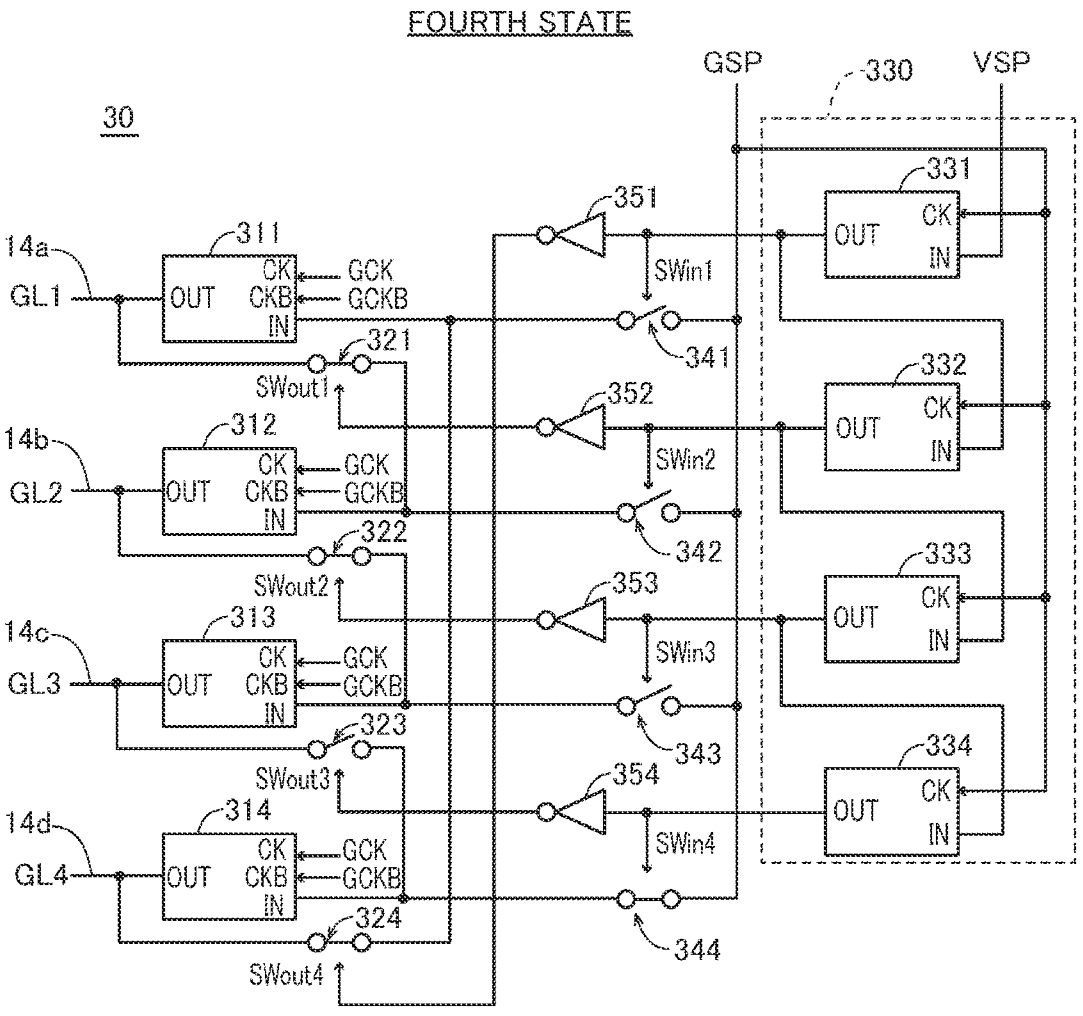
FIG. 7 is a circuit diagram schematically illustrating the configuration of the gate drive circuit.

Thus, when the gate start pulse signal GSP, the clock signal GCK, the clock signal GCKB, and the signal VSP illustrated in FIG. 3 are supplied to the gate drive circuit 30, the period T1 in which the gate start pulse signal GSP is supplied to the first drive circuit 311 as illustrated in FIG. 4, the period T2 in which the gate start pulse signal GSP is supplied to the second drive circuit 312 as illustrated in FIG. 5, the period T3 in which the gate start pulse signal GSP is supplied to the third drive circuit 313 as illustrated in FIG. 6, and the period T4 in which the gate start pulse signal GSP is supplied to the fourth drive circuit 314 as illustrated in FIG. 7, are repeated in this order. In other words, switches 341 to 344 are switches that sequentially switch the drive circuits (any of the first drive circuit 311 to the fourth drive circuit 314) to which the gate start pulse signal GSP is supplied.

As a result, as illustrated in FIG. 3, the gate drive circuit 30 starts the scanning in period T2 from the gate line 14*b* different from the gate line 14*a*, that is first supplied with the gate signal GL1 in period T1 (the gate signal GL2 is supplied to gate line 14*b*), and at the end of scanning in period T2, the gate drive circuit 30 supplies the gate signal GL1 to gate line 14*a*. As illustrated in FIGS. 2 and 3, the gate drive circuit 30 starts scanning in period T2 from the gate line 14*b*, which is adjacent to the gate line 14*a*, after the end of period T1.

In the scanning in period T3, scanning is started from the gate line 14*c* (the gate signal GL3 is supplied to the gate line 14*c*), and the gate signal GL2 is supplied to the gate line 14*b* at the end of scanning in period T3. In other words, the gate drive circuit 30 starts scanning in period T3 from the gate line 14*c*, which is adjacent to the gate line 14*b*, after the end of period T2. In the scanning in period T4, the scanning is started from the gate line 14*d* (the gate signal GL4 is supplied to the gate line 14*d*), and at the end of scanning in period T4, the gate signal GL3 is supplied to the gate line 14*c*. In other words, the gate drive circuit 30 starts scanning in period T4 from the gate line 14*d*, which is adjacent to the gate line 14*c*, after the end of period T3. Then, after period T4, period T1 starts. That is, periods T1 to T4 are repeated.

As illustrated in FIG. 1, the controller 21 stores video signals in the frame memory unit 22. The controller 21 then reads the video signals from the frame memory unit 22 and supplies control signals based on the video signals to the source drive circuit 11. As described above, in the present embodiment, the gate drive circuit 30 scans the gate lines 14*a* to 14*d* in this order in period T1, scans the gate lines 14*b* to 14*d* and 14*a* in this order in period T2, scans the gate lines 14*c*, 14*d*, 14*a*, and 14*b* in this order in period T3, and scans the gate lines 14*d* and 14*a* to 14*c* in this order in period T4. Therefore, in period T2, the controller 21 reads out the video signals from the frame memory unit 22, such that a source signal is first applied when the gate signal GL2 is supplied to the gate line 14*b*, followed by a source signal when the gate signal GL3 is supplied to the gate line 14*c*, a source signal when the gate signal GL4 is supplied to the gate line 14*d*, and a source signal when the gate signal GL1 is supplied to the gate line 14*a* in this order. In the period T3, the controller 21 reads out the video signals from the frame memory unit 22, such that a source signal is first applied when the gate signal GL3 is supplied to the gate line 14*c*, followed by a source signal when the gate signal GL4 is supplied to the gate line 14*d*, a source signal when the gate signal GL1 is supplied to the gate line 14*a*, and a source signal when the gate signal GL2 is supplied to the gate line

14*b* in this order. In the period T4, the controller 21 reads out the video signals from the frame memory unit 22, such that a source signal is first applied when the gate signal GL4 is supplied to the gate line 14*d*, followed by a source signal when the gate signal GL1 is supplied to the gate line 14*a*, a source signal when the gate signal GL2 is supplied to the gate line 14*b*, and a source signal when the gate signal GL3 is supplied to the gate line 14*c* in this order. This enables the source drive circuit 11 to change the gate lines where scanning is started by supplying the source lines 13 with source signals according to the control signals from the controller 21 without changing the content of the video displayed on the display panel 10.

Next, with reference to FIGS. 8 to 11, the results of the comparison of the waveform of the voltage of the pixel electrode 15 in the display device 100 according to the present embodiment and the waveform of the voltage of the pixel electrode in the display device according to a comparative example are described.

Figure 8:
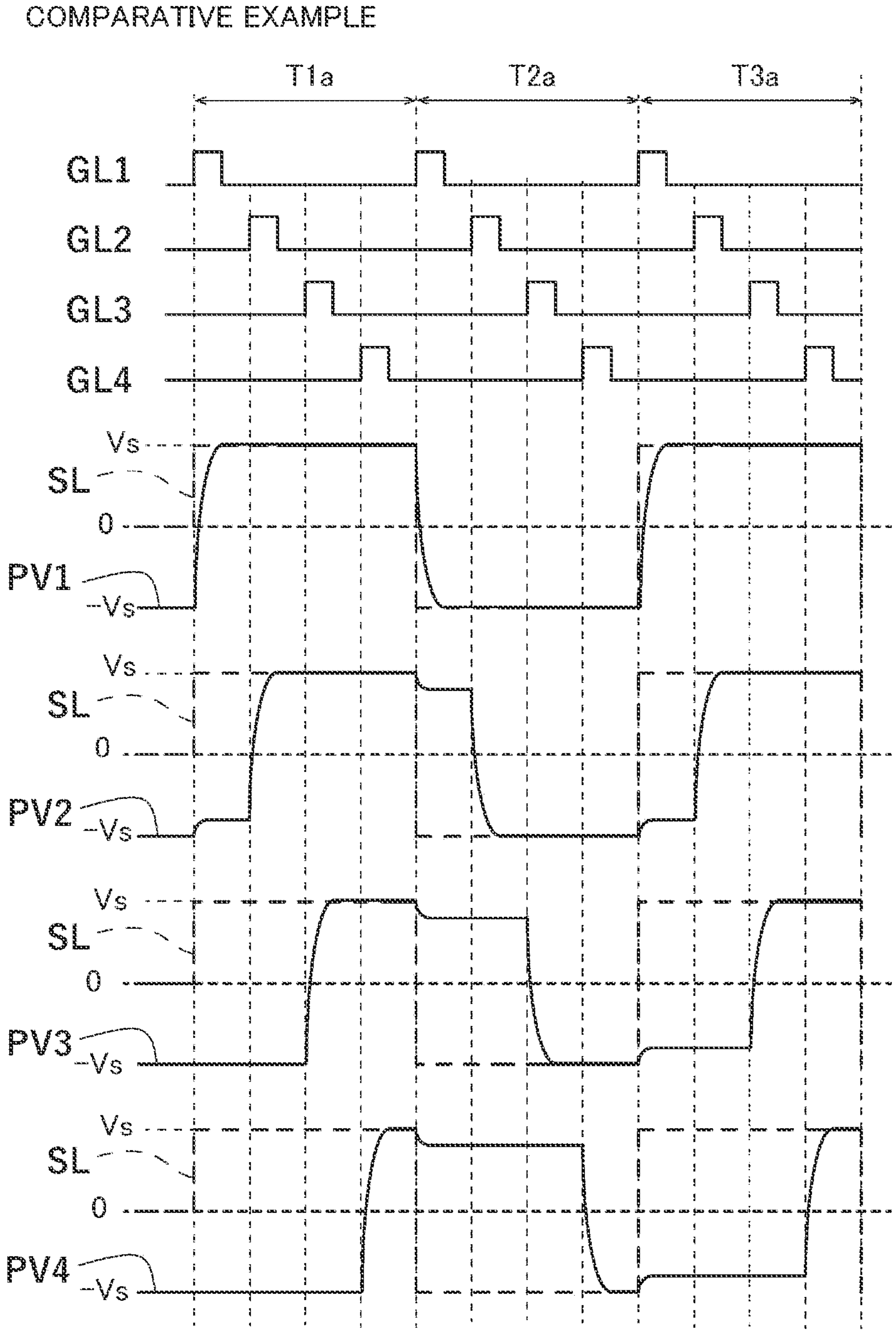
FIG. 8 is a diagram for describing the effect of parasitic capacitance on the voltage of a pixel electrode in a display device according to a comparative example.
Figure 9:
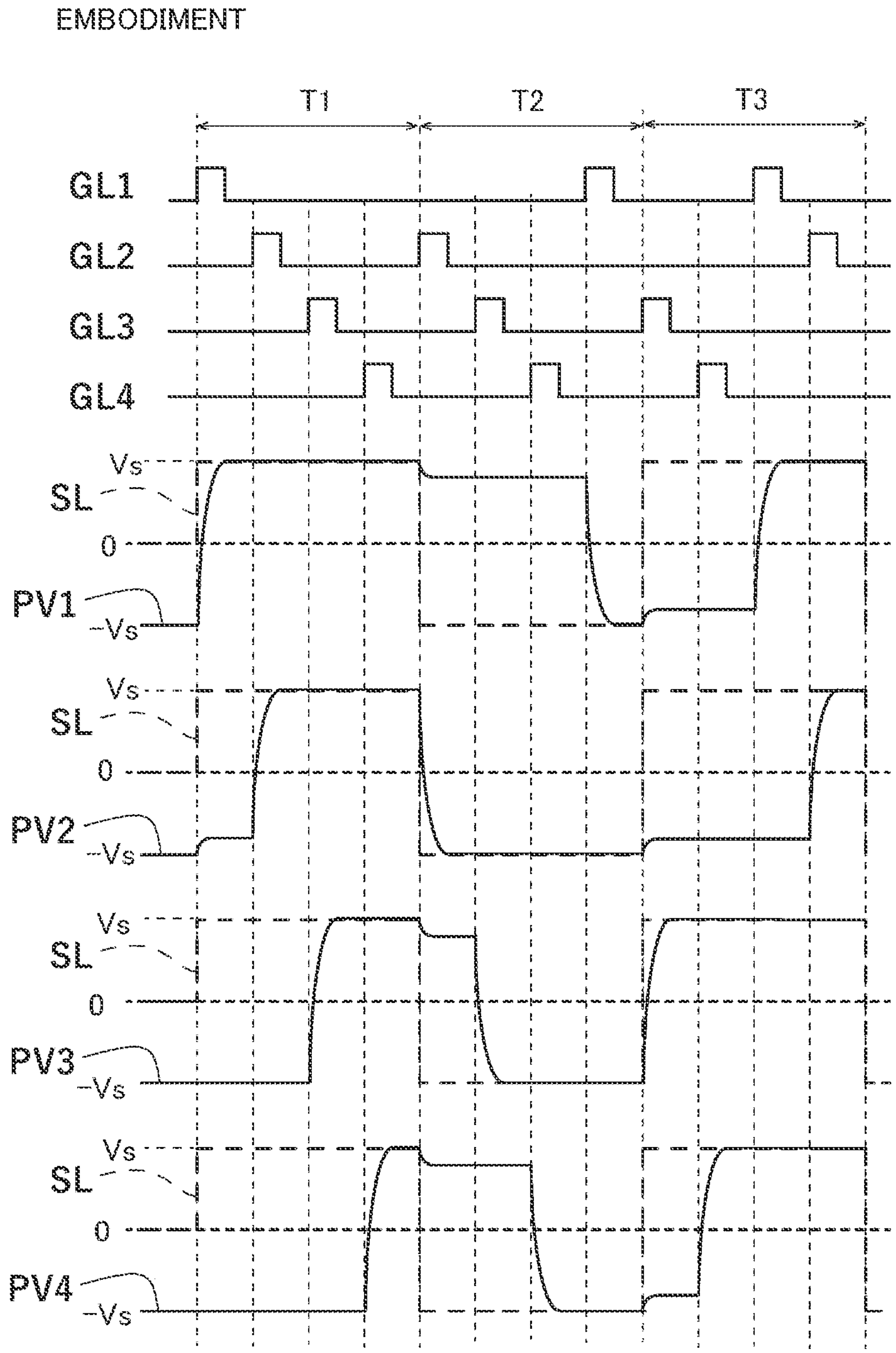
FIG. 9 is a diagram for describing the effect of parasitic capacitance on the voltage of a pixel electrode in the display device according to the present embodiment.
Figure 10:
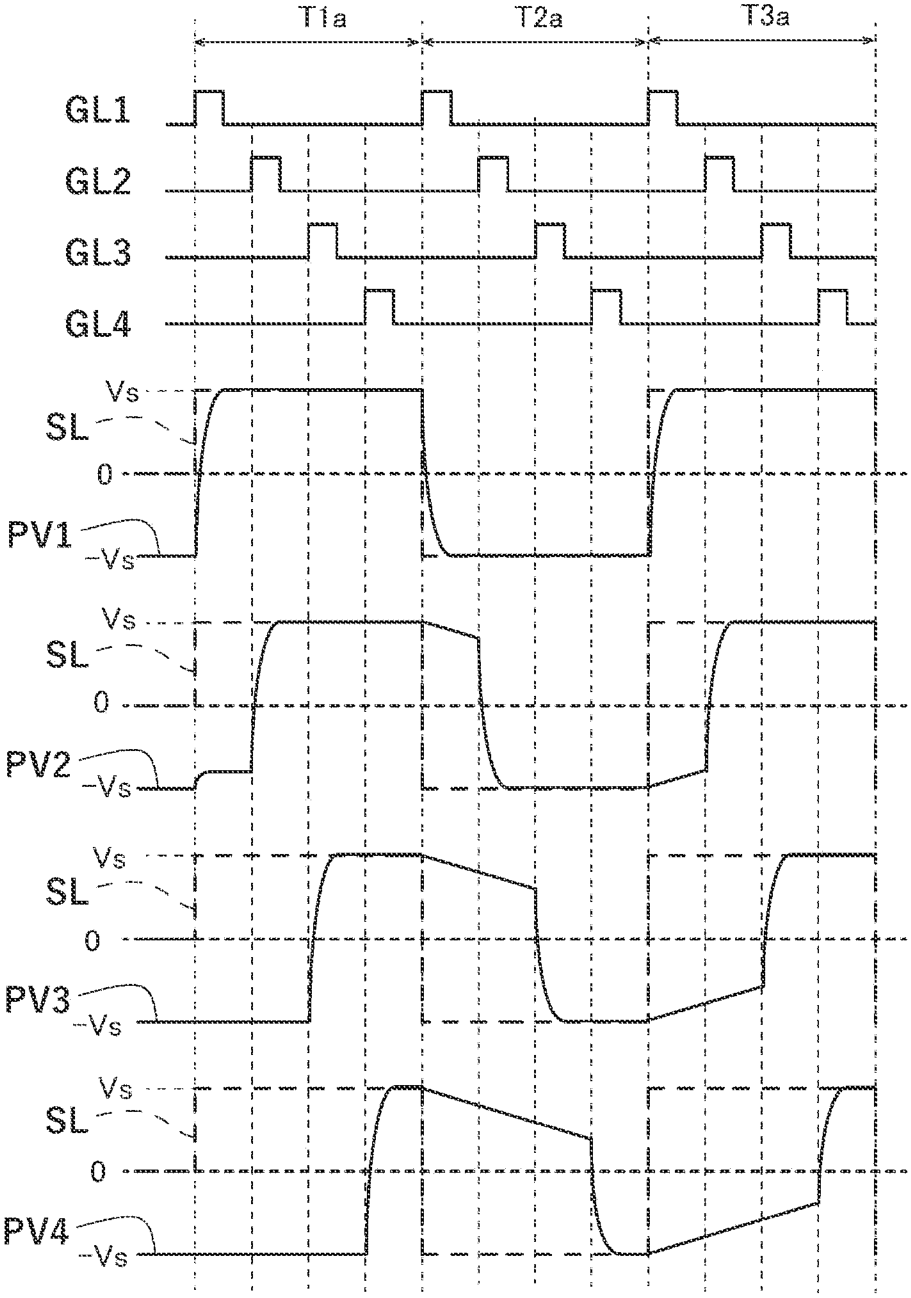
FIG. 10 is a diagram for describing the effect of off-resistance on the voltage of the pixel electrode in the display device according to the comparative example.
Figure 11:
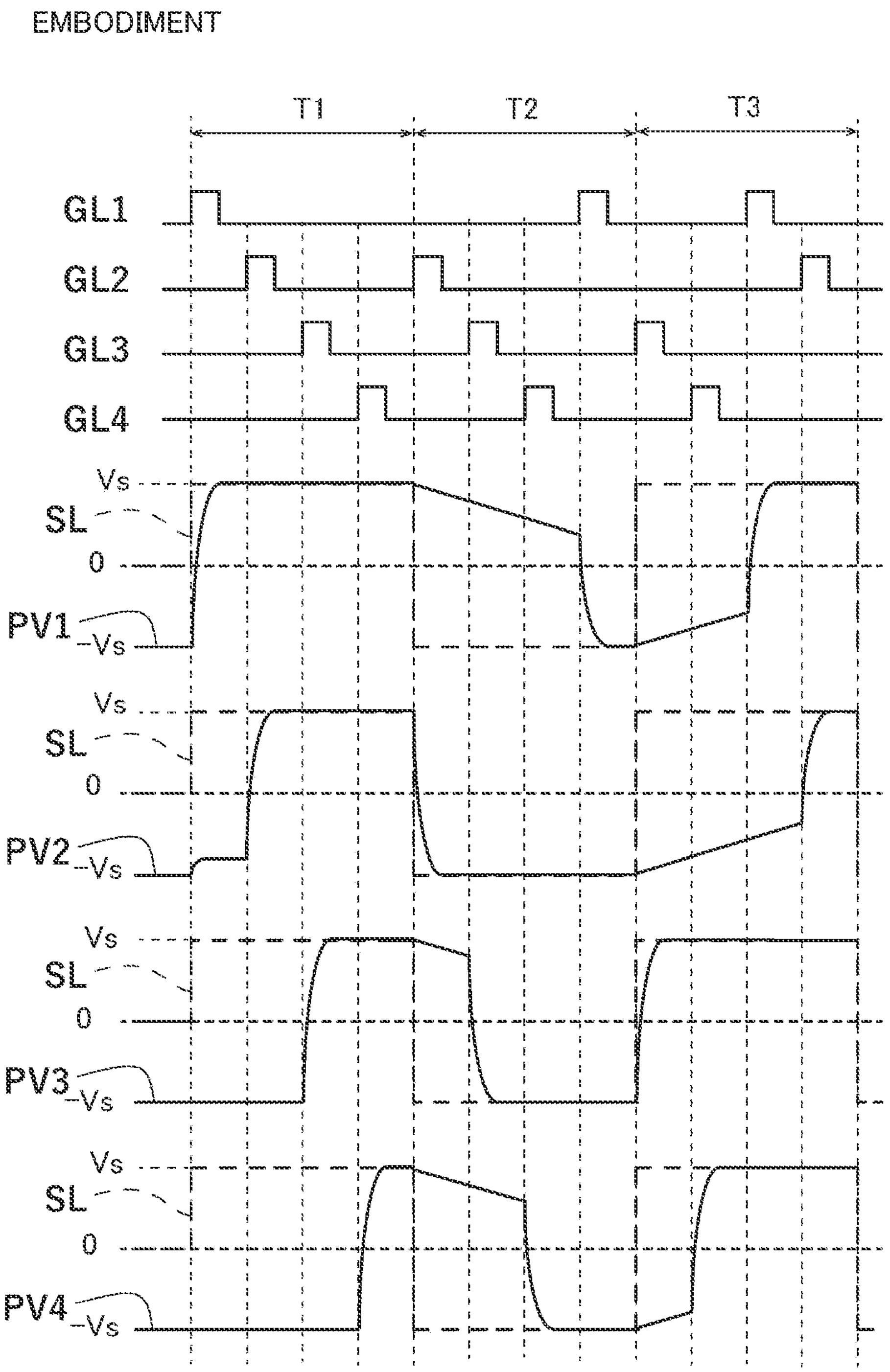
FIG. 11 is a diagram for describing the effect of off-resistance on the voltage of the pixel electrode 15 in the display device 100 according to the present embodiment.

FIG. 8 is a diagram for describing the effect of parasitic capacitance on the voltage of the pixel electrode in a display device according to a comparative example. FIG. 9 is a diagram for describing the effect of parasitic capacitance on the voltage of the pixel electrode 15 in the display device 100 according to the present embodiment. FIG. 10 is a diagram for describing the effect of off-resistance on the voltage of the pixel electrode in the display device according to the comparative example. FIG. 11 is a diagram for describing the effect of off-resistance on the voltage of the pixel electrode 15 in the display device 100 according to the present embodiment.

As illustrated in FIG. 8, in the display device according to the comparative example, the gate signals GL1, GL2, GL3, and GL4 are supplied to the gate lines 14*a* to 14*d* in this order in any vertical scanning period. In addition, source signals with inverted polarity are supplied to the source lines 13 in each vertical scanning period. In the vertical scanning period T1*a* (hereinafter referred to as "period T1*a*"), the potential of the source line 13 becomes Vs, in period T2*a* after period T1*a*, the potential of the source line 13 becomes −Vs, and in period T3*a* after period T2*a*, the potential of the source line 13 becomes Vs.

The potential of the pixel electrode 15 connected to the gate line 14*a*, to which the gate signal GL1 is supplied, is defined as PV1. The potential of the pixel electrode 15 connected to the gate line 14*b*, to which the gate signal GL2 is supplied, is defined as PV2. The potential of the pixel electrode 15 connected to the gate line 14*c*, to which the gate signal GL3 is supplied, is defined as PV3. The potential of the pixel electrode 15 connected to the gate line 14*d*, to which the gate signal GL4 is supplied, is defined as PV4.

In period T1*a*, as for the potential PV1, when the voltage of the gate signal GL1 is High, the pixel electrode 15 is charged by the source signal and the potential becomes equal to Vs. As for the potential PV2, when the voltage of the gate signal GL2 is High, the pixel electrode 15 is charged by the source signal, and the potential becomes equal to Vs. As for the potential PV3, when the voltage of the gate signal GL3 is High, the pixel electrode 15 is charged by the source signal and the potential becomes equal to Vs. As for the potential PV4, when the voltage of the gate signal GL4 is High, the pixel electrode 15 is charged by the source signal and the potential becomes equal to Vs.

In period T2*a*, the potential of the source line 13 becomes −Vs. Then, as for the potential PV1, when the voltage of the gate signal GL1 is High, the pixel electrode 15 is charged by the source signal, and the potential becomes equal to −Vs.

Here, in period T2*a*, a potential difference (Vs−(−Vs)) is generated between the source electrode 12*b* and the drain electrode 12*c* of the TFT 12 that is connected to any one of the gate lines 14*b* to 14*d*, until TFT 12 turns into the ON state. In addition, parasitic capacitance and resistance between the source and drain electrodes (called "off-resistance") are generated between the source and drain electrodes 12*b* and 12*c*. As a result, as illustrated in FIG. 8, the potentials PV2 to PV4 are lower than Vs due to the parasitic capacitance. As illustrated in FIG. 10, the potentials PV2 to PV4 gradually change from Vs to a value lower than Vs due to a current flowing between the source and drain electrodes via the off-resistance, and discharging from the pixel electrode 15. For the sake of description, the change in potential due to parasitic capacitance and the change in potential due to off-resistance are described separately in FIGS. 8 and 10. However, the potentials PV2 to PV4 are subject to both changes in potential due to parasitic capacitance and changes in potential due to off-resistance.

Therefore, for example, when a source signal with a fixed pixel value (Vs) is supplied, in the display device according to the comparative example, the absolute values of the potentials PV1 to PV4 satisfy $|PV1|>|PV2|>|PV3|>|PV4|$ in any vertical scanning period. As a result, when a user views the display device according to the comparative example, the user perceives the luminance in a pixel 10*a*, where the pixel electrode 15 with the potential PV1 is disposed, to be the highest and in a pixel 10*a*, where the pixel electrode 15 with the potential PV4 is disposed, to be the lowest. Therefore, in the display device according to the comparative example, variations in luminance are visible.

Operation of the Present Embodiment

As illustrated in FIG. 9 and FIG. 11, in the display device 100 according to the present embodiment, the gate signal that is supplied first among the gate signals GL1, GL2, GL3, and GL4 is changed in each vertical scanning period. In period T1, the gate signals GL1, GL2, GL3, and GL4 are supplied in this order; in period T2, the gate signals GL2, GL3, GL4, and GL1 are supplied in this order; in period T3, the gate signals GL3, GL4, GL1, and GL2 are supplied in this order; in period T4 (see FIG. 3) the gate signals GL4, GL1, GL2, and GL3 are supplied in this order.

The operation of the display device 100 in period T1 is identical to the operation of the display device according to the comparative example in period T1*a*. Therefore, as illustrated in FIG. 9 and FIG. 11, in period T1, the absolute values of the potentials PV1 to PV4 satisfy $|PV1|>|PV2|>|PV3|>|PV4|$. In period T2, since the gate signals GL2, GL3, GL4, and GL1 are supplied in this order, the relationship of the absolute values of the potentials PV1 to PV4 satisfies $|PV2|>|PV3|>|PV4|>|PV1|$. In period T3, since the gate signals GL3, GL4, GL1, and GL2 are supplied in this order, the relationship of the absolute values of the potentials PV1 to PV4 satisfies $|PV3|>|PV4|>|PV1|>|PV2|$. In period T4, since the gate signals GL4, GL1, GL2, and GL3 are supplied in this order, the relationship of the absolute values of the potentials PV1 to PV4 satisfies $|PV4|>|PV1|>|PV2|>|PV3|$.

In the display device 100, the operation in periods T1 to T4 is repeated. As a result, in each vertical scanning period, locations with high luminance and locations with low luminance change at a speed that is not recognized by a person. When a user views the display device 100 according to the present embodiment, the user recognizes the luminance in the pixel 10*a* in the averaged state in the periods T1 to T4.

Thus, the user perceives the pixel 10*a* with the pixel electrode 15 having the potential PV1, the pixel 10*a* with the pixel electrode 15 having the potential PV2, the pixel 10*a* with pixel electrode 15 having the potential PV3, and the pixel 10*a* with pixel electrode 15 having the potential PV4, as having the same luminance. This allows the display device 100 of the present embodiment to make it difficult for the user to recognize variations in luminance when the user views the screen over multiple vertical scanning periods.

Modifications

The embodiment described above is merely an example for implementing the disclosure. Therefore, the above-described embodiment is not limited thereto, and can be implemented by modifying the above-described embodiment as appropriate within the scope that does not depart from the intent thereof. Variations of the above-described embodiment are described below.

(1) The above-described embodiment illustrates an example in which scanning in period T2 is started from the gate line 14*b* adjacent to the gate line 14*a* that is first supplied with gate signal GL1 in period T1, but this disclosure is not limited to this. In other words, the scanning in period T2 may be started from a gate line that is not adjacent to the gate line 14*a* that is first supplied with the gate signal GL1 in period T1. For example, the scanning in period T2 may be started from the gate line 14*c* instead of the gate line 14*b* adjacent to the gate line 14*a* (the gate line to start scanning may be skipped by one). The scanning in period T2 may be started from a gate line randomly determined from gate lines other than the gate line 14*a*.

(2) The above-described embodiment illustrates an example in which the gate signal GL1 is supplied at the end of scanning in period T2 to the gate line 14*a* to which the gate signal was first supplied in period T1 (first vertical scanning period), but the present disclosure is not limited to this. For example, for the gate line 14*a* to which the gate signal was first supplied in period T1 (first vertical scanning period), the gate signal GL1 may be supplied at a time other than at the end of scanning in period T2.

(3) The above-described embodiment illustrates an example in which the gate signals GL1 to GL4 are supplied to the gate lines in this order, but the present disclosure is not limited to this order. For example, a gate signal other than the gate signal GL2 may be supplied to the gate lines after the gate signal GL1. In addition, as the next gate signal after the gate signal GL1, a gate signal randomly determined from the gate signals for which scanning has not been completed may be supplied to the gate lines.

(4) The above-described embodiment illustrates an example in which the switches 321 to 324, the switches 341 to 344, and the shift register circuit 330 are provided in the gate drive circuit 30 to switch the gate signal supplied at the beginning of scanning, but the present disclosure is not limited to this. For example, control signals (SWin1 to SWin4 and SWout1 to SWout4) may be supplied directly from the control circuit 20 to the switches 321 to 324 and the switches 341 to 344 without providing the shift register circuit 330 in the gate drive circuit 30.

The display device described above can also be described as follows.

The display device according to the first configuration has a thin-film transistor, a source line connected to the thin-film transistor, a plurality of gate lines arranged while intersecting the source line, a gate drive circuit that performs scanning to sequentially supply gate signals to the gate lines, and a source drive circuit that applies a voltage to the source line, and that inverts the polarity of the voltage applied to the source line in each vertical scanning period. The gate drive circuit starts scanning from a first gate line among the gate lines when scanning the gate lines in a first vertical scanning period that is a preceding scanning period of two consecutive vertical scanning periods, and starts scanning from a second gate line different from the first gate line when scanning the plurality of gate lines in a second vertical scanning period following the first vertical scanning period of the two vertical scanning periods (first configuration).

According to the first configuration described above, the gate signal is first supplied in the second vertical scanning period to a gate line different from the gate line that is first supplied with the gate signal in the first vertical scanning period. As a result, the timing at which the thin-film transistor is turned to the ON state in the vertical scanning period can be changed as the vertical scanning period changes. Therefore, the period during which the polarity of the voltage of the source electrode and the polarity of the voltage of the drain electrode are different can be changed in each vertical scanning period. As a result, the location of high luminance and the location of low luminance changes in each vertical scanning period, making it difficult for the user to recognize the variations in luminance in the alignment direction of the gate lines.

In the first configuration, the gate drive circuit may be configured to supply a gate signal lastly in scanning in the second vertical scanning period to a gate line different from a gate line that is lastly supplied with the gate signal in the first vertical scanning period (second configuration).

Here, the location to which the gate signal is supplied lastly in scanning has the lowest luminance. Therefore, according to the above-described second configuration, the location where the luminance is the lowest changes in each vertical scanning period, making it difficult for the user to recognize variations in luminance when the user views the screen over multiple vertical scanning periods.

In the second configuration, the gate drive circuit may supply a gate signal lastly to the first gate line in scanning in the second vertical scanning period (third configuration).

According to the above-described third configuration, the location with the highest luminance in the first vertical scanning period has the lowest luminance in the second vertical scanning period, making it difficult for the user to recognize variations in luminance when the user views the screen over multiple vertical scanning periods.

In any one of the first to third configurations, the gate drive circuit may be configured to start scanning in the second vertical scanning period from the second gate line adjacent to the first gate line (fourth configuration).

According to the above-described fourth configuration, it is possible to sequentially change the gate line from which scanning is started to the adjacent gate line in each vertical scanning period.

In any one of the first to fourth configurations, the gate drive circuit may include a first drive circuit that supplies a gate signal to the first gate line, a second drive circuit that supplies a gate signal to the second gate line, and a switch unit that switches the gate start pulse signal from being supplied to the first drive circuit to being supplied to the second drive circuit when starting scanning in the second vertical scanning period (fifth configuration).

According to the above-described fifth configuration, the switch unit can switch the gate line to which the gate signal is firstly supplied.

In the fifth configuration, the switch unit may include a first switch connected to the first drive circuit, and a second switch connected to the second drive circuit. The gate drive circuit may further include a shift register that supplies signals to the first switch and the second switch to switch ON and OFF states sequentially in each vertical scanning period (sixth configuration).

According to the above-described sixth configuration, since the shift register can change the state of the switch unit in each vertical scanning period, the gate line to which the gate signal is first supplied can be changed by the switch unit in each vertical scanning period.

The present disclosure contains subject matter related to that disclosed in Japanese Priority Patent Application JP 2022-186900 filed in the Japan Patent Office on Nov. 22, 2022, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device, comprising:
- a thin-film transistor;
- a source line connected to the thin-film transistor;
- a plurality of gate lines arranged while intersecting the source line;
- a gate drive circuit that performs scanning to sequentially supply a gate signal to the plurality of gate lines; and
- a source drive circuit that applies a voltage to the source line and that inverts a polarity of the voltage applied to the source line in each vertical scanning period, wherein
- the gate drive circuit, in performing the scanning, starts scanning from a first gate line, among the plurality of gate lines, when scanning the plurality of gate lines in a first vertical scanning period that is a preceding scanning period of three consecutive vertical scanning periods, starts scanning from a second gate line different from the first gate line when scanning the plurality of gate lines in a second vertical scanning period following the first vertical scanning period, and starts scanning from a third gate line different from the first gate line and the second gate line when scanning the plurality of gate lines in a third vertical scanning period following the second vertical scanning period.

2. The display device according to claim 1, wherein
- the gate drive circuit supplies a gate signal, as a last signal, in scanning in the second vertical scanning period to a gate line of the plurality of gate lines that is different from another gate line of the plurality of gate lines that is supplied with the gate signal, as the last signal, in the first vertical scanning period.

3. The display device according to claim 2, wherein
- the gate drive circuit supplies a gate signal, as the last signal, to the first gate line in scanning in the second vertical scanning period.

4. The display device according to claim 1, wherein
- the gate drive circuit starts scanning in the second vertical scanning period from the second gate line adjacent to the first gate line.

5. The display device according to claim 1, wherein the gate drive circuit includes
- a first drive circuit that supplies a gate signal to the first gate line,
- a second drive circuit that supplies a gate signal to the second gate line, and
- a switch unit that switches a gate start pulse signal from being supplied to the first drive circuit to being supplied to the second drive circuit when starting scanning in the second vertical scanning period.

6. The display device according to claim 5, wherein
- the switch unit includes a first switch connected to the first drive circuit, and a second switch connected to the second drive circuit, and
- the gate drive circuit further includes a shift register that supplies signals to the first switch and the second switch to sequentially switch between ON and OFF states in each vertical scanning period.

* * * * *